United States Patent
Tohji et al.

(10) Patent No.: US 10,046,971 B2
(45) Date of Patent: Aug. 14, 2018

(54) NITROGEN-CONTAINING CARBON MATERIAL AND METHOD OF MANUFACTURING THE SAME

(71) Applicants: Stella Chemifa Corporation, Osaka-shi (JP); Tohoku University, Sendai-shi, Miyagi (JP)

(72) Inventors: Kazuyuki Tohji, Sendai (JP); Yoshinori Sato, Sendai (JP); Koji Yokoyama, Sendai (JP); Kazutaka Hirano, Izumiotsu (JP); Yoshinori Sato, Izumiotsu (JP)

(73) Assignees: Stella Chemifa Corporation, Osaka-shi (JP); Tohoku University, Sendai-shi (JP)

( * ) Notice: Subject to any disclaimer, the term of this patent is extended or adjusted under 35 U.S.C. 154(b) by 0 days.

(21) Appl. No.: 14/971,685

(22) Filed: Dec. 16, 2015

(65) Prior Publication Data

US 2016/0167968 A1   Jun. 16, 2016

(30) Foreign Application Priority Data

Dec. 16, 2014 (JP) ................................ 2014-253675

(51) Int. Cl.
*H01M 4/96* (2006.01)
*C01B 21/082* (2006.01)
*C01B 31/02* (2006.01)

(52) U.S. Cl.
CPC ........ *C01B 31/0273* (2013.01); *C01B 21/082* (2013.01); *H01M 4/96* (2013.01); *C01B 2202/02* (2013.01)

(58) Field of Classification Search
None
See application file for complete search history.

(56) References Cited

FOREIGN PATENT DOCUMENTS

JP    2012-006817 A    1/2012

OTHER PUBLICATIONS

Tappert "Chapter 3: The Colors of Diamonds" Diamonds in Nature: A Guide to Rough Diamonds, 2011, p. 45-68.*

(Continued)

*Primary Examiner* — Jafar Parsa
*Assistant Examiner* — Amy C Bonaparte
(74) *Attorney, Agent, or Firm* — Knobbe Martens Olson & Bear LLP

(57) ABSTRACT

A nitrogen-containing carbon material to the present invention comprises a carbon material having a carbon skeleton formed of carbon atoms and nitrogen atoms introduced into the carbon material, wherein part of carbon atoms in the carbon skeleton are substituted with nitrogen atoms. The nitrogen-containing carbon material according to the present invention can be produced by a production method including the steps of bringing the carbon material into contact with a first treatment gas containing a fluorine-containing gas to subject a surface of the carbon material to a fluorination treatment; and bringing the carbon material after being subjected to the fluorination treatment into contact with a second treatment gas containing a nitrogen-containing gas with heating to perform a nitriding treatment.

12 Claims, 11 Drawing Sheets

○ Fluorine atom
◎ Nitrogen atom

(56) References Cited

OTHER PUBLICATIONS

Chen ("Nitrogen-Doping Effects on Carbon Nanotubes and the Origin of the Enhanced Electrocatalytic Activity of Supported Pt for Proton-Exchange Membrane Fuel Cells" The Journal of Physical Chemistry C, 2011, 115, p. 3769-3776).*
Ghosh ("Micro-structural, electron-spectroscopic and filed-emission studies of carbon nitride nanotubes grown from cage-like and linear carbon sources" Carbon, 47, 2009, p. 1565-1575).*
Jian ("Structural and Compositional Regulation of Nitrogen-Doped Carbon Nanotubes with Nitrogen-Containing Aromatic Precursors" The Journal of Physical Chemistry C, 2013, 117, p. 7811-7817).*
Ewels ("Nitrogen Doping in Carbon Nanotubes" Journal of Nanoscience and Nanotechnology, 5, 2005, p. 1345-1363).*
Okotrub ("Fluorination of CN Nanotubes" Fullerenes, Nanotubes, and Carbon Nanostructures, vol. 12, 2005, p. 99-14) (Year: 2005).*
Bulusheva ("Fluorination of Multiwall Nitrogen-Doped Carbon Nanotubes" Russian Journal of Inorganic Chemistry, 2006, vol. 51, No. 4, p. 613-618) (Year: 2006).*
Kuanping Gong, et al. "Nitrogen-Doped Carbon Nanotube Arrays with High Electrocatalytic Activity for Oxygen Reduction." *Science*. 323, p. 760-764 (2009).
Kazuyuki Taji, et al. "Synthesis of functional materials with defluorination of fluorine single-walled carbon nanotube." The Society of Department of Chemistry. Sep. 13, 2015.
Kou Yokoyama, et al. "Nitrogen doped single walled carbon nanotubes by defluorination-assisted substitution." The Mining and Materials Processing Institute of Japan. Jun. 17, 2015.
Koji Yokoyama, et al. "Characteristics of the synthesized n-type nitrogen-containing single-walled carbon nanotubes by defluorination." The Mining and Materials Processing Institute of Japan. Nov. 16, 2015.
Koji Yokoyama, et al. "Research on surface modification of the fluorine single walled carbon nanotubes in a gas phase with ammonia gas." The Mining and Materials Processing Institute of Japan. Jun. 17, 2014.
Yokoyama, et al. "Defluorination-assisted nanotube-substitution reaction with ammonia gas for synthesis of nitrogen-doped single-walled carbon nanotubes." *Carbon*. 94 (2015) p. 1052-1060.

* cited by examiner

NITROGEN-CONTAINING CARBON MATERIAL AND METHOD OF MANUFACTURING THE SAME

BACKGROUND

Field

The present invention relates to a nitrogen-containing carbon material and a manufacturing method thereof, and more specifically, the present invention relates to a nitrogen-containing carbon material prepared by allowing a nitrogen atom to be contained in a carbon material having a carbon skeleton formed of carbon atoms such as a carbon nanotube, and a manufacturing method thereof.

Description of the Related Art

Single-walled carbon nanotubes (SWCNTs) are hollow cylindrical substances composed only of $sp^2$ hybridized carbon atoms and are expected to be applied to various energy devices and electronic devices because of their high conductivity and excellent carrier transport characteristics. Of these, carbon nanotubes containing nitrogen atoms have attracted great interest in recent years because they exert excellent characteristics for field emission characteristics, gas storage characteristics, electron transfer characteristics, and the like. For example, Kuanping Gonng, et al. reports the utilization thereof for an air electrode of a fuel cell (Science Vol. 323 (2009), 760-764).

Examples of a method of manufacturing a carbon nanotube containing nitrogen atoms include a chemical vapor deposition method (CVD method). However, since this method provides a low introduction ratio of the nitrogen atoms and greatly depends on the kind of raw material and the synthesis conditions such as the catalyst, the reaction temperature, and the gas flow rate, there remains the issue of how to enhance the introduction ratio.

Examples of the method also include a method of introducing nitrogen atoms into a previously produced carbon nanotube. Examples of such a method include a method disclosed in JP 2012-6817 A, which teaches a carbon nanotube subjected to an oxidizing treatment in a vapor phase, after which the carbon nanotube is further subjected to a nitriding treatment in a vapor phase, so that a nitrogen-containing carbon nanotube can be produced.

However, when this method is employed, by subjecting a carbon nanotube to an oxidizing treatment, there are problems that the carbon nanotube is damaged, is decomposed or the like, and structural defects occur.

SUMMARY

The present invention has been made in view of the problems, and an object of the present invention is to provide a nitrogen-containing carbon material prepared by allowing a nitrogen atom to be introduced into a carbon material such as a carbon nanotube while suppressing the occurrence of structural defects, and a manufacturing method thereof.

In order to solve the above-mentioned problems, the nitrogen-containing carbon material according to the present invention comprises a carbon material having a carbon skeleton formed of carbon atoms and a nitrogen atom introduced into the carbon material, wherein part of carbon atoms in the carbon skeleton are substituted with a nitrogen atom.

In the above-mentioned configuration, it is preferable that the nitrogen-containing carbon material comprises an amino group introduced onto a surface of the carbon material.

In the above-mentioned configuration, the nitrogen atoms introduced into the carbon skeleton by substituting part of carbon atoms therewith are mainly pyridine-type nitrogen atoms, or pyridine-type nitrogen atoms and pyrrole-type nitrogen atoms.

Moreover, in the above-mentioned configuration, a carbon-fluorine bond exists on a surface of the nitrogen-containing carbon material.

In the above-mentioned configuration, it is preferable that the carbon material before introduction of nitrogen atoms is at least one kind selected from the group consisting of carbon nanocoil, graphite, carbon black, diamond-like carbon, carbon fiber, graphene, amorphous carbon, fullerene, carbon nanotube and diamond.

In order to solve the above-mentioned problems, the method of producing a nitrogen-containing carbon material according to the present invention is a method of producing a nitrogen-containing carbon material in which nitrogen atoms are introduced into a carbon material having a carbon skeleton formed of carbon atoms, and includes the steps of bringing the carbon material into contact with a first treatment gas containing a fluorine-containing gas to subject a surface of the carbon material to a fluorination treatment; and bringing the carbon material after being subjected to the fluorination treatment into contact with a second treatment gas containing a nitrogen-containing gas with heating to perform a nitriding treatment.

In the above-mentioned configuration, it is preferred that the fluorination treatment be performed under the condition of a treatment period of 1 second to 24 hours and a treatment temperature of 0° C. to 600° C. using a gas containing a fluorine-containing gas in a content of 0.01 to 100 vol % relative to the whole volume as the first treatment gas, and the nitriding treatment be performed under the condition of a treatment period of 1 second to 24 hours using a gas containing a nitrogen-containing gas in a content of 0.01 to 100 vol % relative to the whole volume as the second treatment gas.

In the above-mentioned configuration, it is preferable that by performing the nitriding treatment at a treatment temperature higher than or equal to 25° C. and lower than 300° C., an amino group is introduced onto a carbon material surface after being subjected to the fluorination treatment, and part of carbon atoms in the carbon skeleton are substituted with a nitrogen atom.

Moreover, in the above-mentioned configuration, it is preferable that by performing the nitriding treatment at a treatment temperature higher than or equal to 300° C. and lower than or equal to 1500° C., part of carbon atoms in the carbon skeleton of the carbon material after being subjected to the fluorination treatment are substituted with a nitrogen atom.

Furthermore, in the above-mentioned configuration, the nitrogen atoms introduced into the carbon skeleton by substituting part of carbon atoms therewith are mainly pyridine-type nitrogen atoms, or pyridine-type nitrogen atoms and pyrrole-type nitrogen atoms.

Moreover, in the above-mentioned configuration, the method of producing a nitrogen-containing carbon material does not have to include a step for removing fluorine atoms existing at carbon-fluorine bond moieties on a surface of the nitrogen-containing carbon material after the carbon material is subjected to the nitriding treatment.

Moreover, in the above-mentioned configuration, it is preferable that the carbon material before being subjected to the fluorination treatment is at least one kind selected from the group consisting of carbon nanocoil, graphite, carbon black, diamond-like carbon, carbon fiber, graphene, amorphous carbon, fullerene, carbon nanotube and diamond.

In order to solve the above-mentioned problems, the air electrode catalyst for a fuel cell according to the present invention is an air electrode catalyst for a fuel cell used as an air electrode catalyst of a fuel cell, and is prepared using a nitrogen-containing carbon material described above.

According to the present invention, the carbon material is brought into contact with a first treatment gas containing a fluorine-containing gas to subject a surface of the carbon material to a fluorination treatment, and fluorine atoms are introduced to form reactive scaffolds. Then, by bringing the carbon material into contact with a second treatment gas containing a nitrogen-containing gas with heating to perform a nitriding treatment, nitrogen atoms can be introduced at the reactive scaffolds. That is, according to the present invention, since it becomes possible to allow a nitrogen atom to be contained in the carbon material in a vapor phase, for example, it becomes possible to introduce a nitrogen atom into an oriented film of a single-walled carbon nanotube perpendicularly oriented on a substrate without inhibiting perpendicular orientation characteristics of the single-walled carbon nanotube. With this setup, the electronic state of a single-walled carbon nanotube can be changed and a nitrogen-containing carbon material further excellent in field emission characteristics, gas storage property, electron transfer property, and the like can be obtained.

As used throughout this disclosure, the singular forms "a," "an," and "the" include plural reference unless the context clearly dictates otherwise. Thus, for example, a reference to "a nitrogen atom" includes a plurality of such nitrogen atoms, as well as a single nitrogen atom.

DETAILED DESCRIPTION

Embodiments of the present disclosure will be described below. The nitrogen-containing carbon material according to the present embodiment can be produced by a manufacturing method including at least a step of subjecting a surface of a carbon material to a fluorination treatment and a step of subjecting the carbon material after being subjected to the fluorination treatment to a nitriding treatment.

The carbon material is not particularly limited as long as the material has a carbon skeleton formed of carbon atoms. Examples of the carbon material preferably include a carbon material having a cyclic skeleton in which carbon atoms are annularly bonded together, and diamond. Examples of the carbon material having a cyclic skeleton of carbon atoms include carbon nanocoil, graphite, carbon black, diamond-like carbon, carbon fiber, graphene, amorphous carbon, fullerene, and carbon nanotube. Furthermore, examples of the carbon nanotube include a single-walled carbon nanotube (SWNT: Single Wall Carbon Nanotube) in which a tube (graphene sheet) of a hexagonal mesh shape has a one-sheet structure, a multi-walled carbon nanotube (MWNT: Multi Wall Carbon Nanotube) constituted of a multi-layered graphene sheet, a fullerene tube, a buckytube, and a graphite fibril. In this connection, the "carbon skeleton" is a skeletal frame containing neither a hydrogen atom nor a substituent and means a frame all composed of carbon atoms.

Figure 1A:
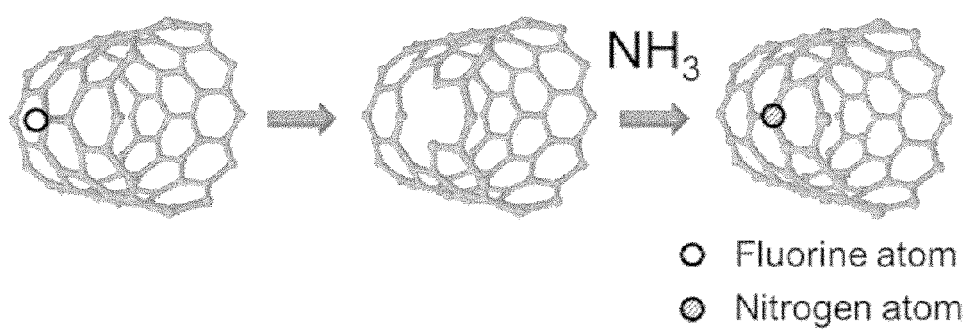
FIG. 1A is an explanatory illustration for explaining a method of manufacturing a nitrogen-containing carbon material according to an embodiment of the present invention and shows a step of introducing nitrogen into a carbon skeleton.
Figure 1B:
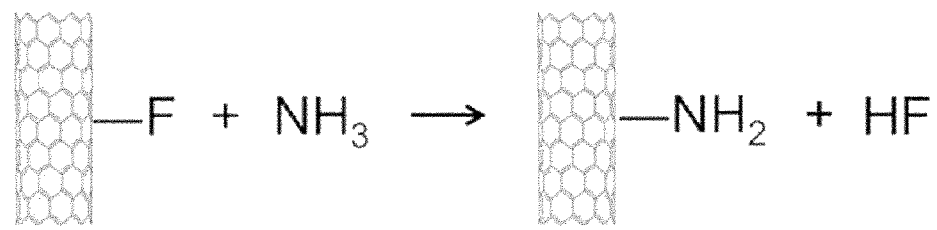
FIG. 1B is an explanatory illustration for explaining a method of manufacturing a nitrogen-containing carbon material according to an embodiment of the present invention and shows a step of introducing an amino group onto a surface of the carbon material.

The step of performing a fluorination treatment comprises the step of bringing a carbon material into contact with a first treatment gas containing at least a fluorine-containing gas, and thereby subjecting a surface thereof to a fluorination treatment in a vapor phase. In the step, specifically, as shown in FIGS. 1A and 1B, a fluorine group is introduced onto a surface of the carbon material by virtue of the carbon-fluorine bond. Thus, for example, the fluorination treatment is different from an oxidizing treatment in which an edge part of a carbon hexagonal mesh plane is imparted with an oxygen-containing functional group such as a hydroxyl group, a carbonyl group or a carboxyl group.

As the first treatment gas, one which contains a fluorine-containing gas preferably in a content of 0.01 to 100 vol %, more preferably 0.1 to 80 vol %, and further preferably 1 to 50 vol % relative to the whole volume is used. By setting the concentration of the fluorine-containing gas to be greater than or equal to 0.01 vol %, it is possible to prevent the fluorination of a carbon material surface from becoming insufficient.

The fluorine-containing gas means a gaseous matter containing a fluorine atom, and is not particularly limited as long as the gaseous matter contains a fluorine atom in the present embodiment. Examples of such a fluorine-containing gas include hydrogen fluoride (HF), fluorine ($F_2$), chlorine trifluoride ($ClF_3$), sulfur tetrafluoride ($SF_4$), boron trifluoride ($BF_3$), nitrogen trifluoride ($NF_3$), and carbonyl fluoride ($COF_2$). These may be used alone or as a mixture of two or more kinds thereof.

In the first treatment gas, an inert gas may be contained. Although the inert gas is not particularly limited, one which reacts with a fluorine-containing gas and adversely affects the fluorination treatment of the carbon material, one which reacts with a carbon material and adversely affects the fluorination treatment and one which contains impurities adversely affecting the fluorination treatment are not preferred. Specific examples of the inert gas include nitrogen, argon, helium, neon, krypton, and xenon. These can be used alone or as a mixture of two or more kinds thereof. Moreover, although the purity of the inert gas is not particularly limited, the content of impurities adversely affecting the fluorination treatment is preferably less than or equal to 100 ppm, more preferably less than or equal to 10 ppm, and especially preferably less than or equal to 1 ppm.

In this connection, it is preferred that an oxygen atom-containing gas not be contained in the first treatment gas. This is because by allowing the oxygen atom-containing gas to be contained therein, a hydroxyl group, a carboxyl group and the like are introduced onto a surface of the carbon material, and there is a case where the carbon material is greatly damaged. In this connection, the oxygen atom-containing gas means oxygen gas or nitric acid gas.

Although the treatment temperature at the time of performing a fluorination treatment is not particularly limited, the treatment temperature preferably lies within the range of 0° C. to 600° C., more preferably lies within the range of 10° C. to 400° C., and further preferably lies within the range of 25° C. to 350° C. By setting the treatment temperature to be higher than or equal to 0° C., the fluorination treatment can be promoted. On the other hand, by setting the treatment temperature to be lower than or equal to 600° C., the elimination of the fluorine atom from the carbon-fluorine bond formed is suppressed, and it is possible to prevent the treatment efficiency from being reduced. Moreover, it is possible to suppress the carbon material from being deformed by heat and suppress the lowering in yield.

Although the treatment period (reaction time) of the fluorination treatment is not particularly limited, the treatment period preferably lies within the range of 1 second to 24 hours, more preferably lies within the range of 1 minute to 12 hours, and further preferably lies within the range of 1 minute to 9 hours. By setting the treatment period to be longer than or equal to 1 second, it is possible to prevent the fluorination of a carbon material surface from becoming insufficient. On the other hand, by setting the treatment period to be shorter than or equal to 24 hours, it is possible to prevent the lowering in manufacturing efficiency due to a prolonged period of manufacturing time.

The pressure condition at the time of performing a fluorination treatment is not particularly limited, and the fluorination treatment may be performed under elevated pressure or under reduced pressure. From the viewpoints of the economical aspect and the safety aspect, it is preferred that the fluorination treatment be performed under normal pressure. The reaction vessel for performing a fluorination treatment is not particularly limited, and a conventionally known one such as a fixed bed type one or a fluidized bed type one can be employed.

A method for bringing a carbon material into contact with a first treatment gas is not particularly limited, and for example, the carbon material can be brought into contact with a first treatment gas under a flow of the first treatment gas.

The step of performing a nitriding treatment is the step of bringing a carbon material after being subjected to the fluorination treatment into contact with a second treatment gas containing at least a nitrogen-containing gas to introduce nitrogen atoms into the carbon material in a vapor phase. In the step, the introduction form of nitrogen atoms introduced into the carbon material can be changed depending on the treatment temperature (the details will be described later).

Although the second treatment gas is not particularly limited as long as the gas contains a nitrogen-containing gas, one in which the nitrogen-containing gas is contained preferably in a content of 0.01 to 100 vol %, more preferably 0.1 to 80 vol %, and further preferably 1 to 50 vol % relative to the whole volume of the second treatment gas is used. By setting the concentration of the nitrogen-containing gas to be greater than or equal to 0.01 vol %, it is possible to prevent the nitriding of a carbon material from becoming insufficient.

The nitrogen-containing gas means a gaseous matter containing a nitrogen atom, and is not particularly limited as long as the gaseous matter contains a nitrogen atom in the present embodiment. Examples of such a nitrogen-containing gas include ammonia ($NH_3$), diazene ($N_2H_2$), hydrazine ($N_2H_4$), ammonium chloride ($NH_4Cl$), $N_3H_8$, and an amine compound. These may be used alone or as a mixture of two or more kinds thereof. Moreover, in the case where each of these compounds is a liquid or a solid at normal temperature, the compound is heated and gasified within the treatment temperature range described later to perform a nitriding treatment.

In this connection, the amine compound is not particularly limited, and examples thereof include a primary amine, a secondary amine, and a tertiary amine. Furthermore, examples of the primary amine include methylamine, ethylamine, propylamine, isopropylamine, and butylamine. Examples of the secondary amine include dimethylamine, diethylamine, dipropylamine, diisopropylamine, and dibutylamine. Examples of the tertiary amine include trimethylamine, triethylamine, tripropylamine, triisopropylamine, and tributylamine.

In the second treatment gas, an inert gas may be contained. Although the inert gas is not particularly limited, one which reacts with the nitrogen-containing gas and adversely affects the nitriding treatment of the carbon material, one which reacts with a carbon material and adversely affects the nitriding treatment and one which contains impurities adversely affecting the nitriding treatment are not preferred. Specific examples of the inert gas include nitrogen, argon, helium, neon, krypton, and xenon. These can be used alone or as a mixture of two or more kinds thereof. Moreover, although the purity of the inert gas is not particularly limited, the content of impurities adversely affecting the nitriding treatment is preferably less than or equal to 100 ppm, more preferably less than or equal to 10 ppm, and especially preferably less than or equal to 1 ppm.

In this context, the form of introducing nitrogen atoms at the time of introduction thereof into the carbon material can be controlled by the treatment temperature in the nitriding treatment step. More specifically, by setting the treatment temperature preferably within a range higher than or equal to 25° C. and lower than 300° C., more preferably within a range of 50° C. to 250° C., and further preferably within a range of 100° C. to 200° C. to perform a nitriding treatment, amino groups can be introduced onto a carbon material surface after being subjected to the fluorination treatment, and part of carbon atoms in the carbon skeleton can be substituted with nitrogen atoms. In this case, by setting the treatment temperature to be higher than or equal to 25° C., it is possible to prevent the introduction of the amino groups onto a carbon material surface from becoming insufficient. Moreover, by setting the treatment temperature preferably within a range higher than or equal to 300° C. and lower than or equal to 1500° C., more preferably within a range of 400° C. to 1500° C., and further preferably within a range of 400° C. to 1200° C. to perform a nitriding treatment, without allowing an amino group to be introduced onto a carbon material surface, only part of carbon atoms in the carbon skeleton can be substituted with nitrogen atoms. In this case, by setting the treatment temperature to be lower than or equal to 1500° C., it is possible to suppress the carbon material from being deformed by heat and suppress the lowering in yield.

In this context, examples of the amino group introduced onto a carbon material surface include a monosubstituted amino group and a disubstituted amino group, other than the $NH_2$ group. As the monosubstituted amino group, a monoalkylamino group with 1 to 10 carbon atoms, more specifically, a methylamino group ($NHCH_3$ group), an ethylamino group ($NHC_2H_5$ group), or the like is preferred. Moreover, as the disubstituted amino group, a dialkylamino group with 1 to 10 carbon atoms, more specifically, a dimethylamino group ($N(CH_3)_2$ group), a diethylamino group ($N(C_2H_5)_2$ group), or the like is preferred.

The nitrogen atoms (nitrogen species) introduced by substituting part of carbon atoms in the carbon skeleton therewith are mainly pyridine-type nitrogen atoms, or pyridine-type nitrogen atoms and pyrrole-type nitrogen atoms. More specifically, for example, in the case where the treatment temperature of the nitriding treatment is 25° C., the nitrogen atoms are mainly pyridine-type nitrogen atoms, and in the case where the treatment temperature of the nitriding treatment is higher than 25° C. and lower than or equal to 1500° C., the nitrogen atoms are mainly pyridine-type nitrogen atoms and pyrrole-type nitrogen atoms. Moreover, the nitrogen atoms are introduced into the carbon skeleton while suppressing structural defects thereof from occurring. In this connection, for example, in the case where nitrogen atoms are introduced into the carbon skeleton of a carbon material by a CVD (Chemical Vapor Deposition) method, the nitrogen atoms are graphite-type nitrogen atoms and pyridine-type nitrogen atoms.

Furthermore, into the carbon skeleton, graphite-type nitrogen atoms may be introduced, and in this case, as a result of being allowed to effectively function as n-type dopants, n-type carrier transport characteristics can be exerted.

Although the treatment period (reaction time) of the nitriding treatment is not particularly limited, the treatment period preferably lies within the range of 1 second to 24 hours, more preferably lies within the range of 2 minutes to 6 hours, and further preferably lies within the range of 30 minutes to 4 hours. By setting the treatment period to be longer than or equal to 1 second, it is possible to prevent the introduction of the nitrogen atoms to a carbon material from becoming insufficient. On the other hand, by setting the treatment period to be shorter than or equal to 24 hours, it is possible to prevent the lowering in manufacturing efficiency due to a prolonged period of manufacturing time.

In this context, the nitriding treatment may be continuously performed by allowing a second treatment gas containing at least a nitrogen-containing gas to be introduced into a reaction vessel without removing the carbon material after being subjected to the fluorination treatment from the reaction vessel. Consequently, complicated operation can be dispensed with, and shortening of the treatment period can be attained. Furthermore, with regard to the carbon material after being subjected to the fluorination treatment, nitrogen atoms can be introduced into the carbon material without being affected by moisture and oxygen in the atmosphere.

The pressure condition at the time of performing a nitriding treatment is not particularly limited, and the nitriding treatment may be performed under elevated pressure or under reduced pressure. From the viewpoints of the economical aspect and the safety aspect, it is preferred that the nitriding treatment be performed under normal pressure. The reaction vessel for performing a nitriding treatment is not particularly limited, and a conventionally known one such as a fixed bed type one or a fluidized bed type one can be employed.

A method for bringing a carbon material into contact with a second treatment gas is not particularly limited, and for example, the carbon material can be brought into contact with a second treatment gas under a flow of the second treatment gas.

In this context, on a surface of the nitrogen-containing carbon material after being subjected to the nitriding treatment, fluorine atoms exist at carbon-fluorine bond moieties. As such, in the case where the purpose is to maintain the dispersibility of a nitrogen-containing carbon material in a dispersion medium, it is preferred that no step of removing the fluorine atoms be included. In the case where the fluorine atoms exist, the nitrogen-containing carbon material is imparted with polarity and it is possible to prevent particles of nitrogen-containing carbon materials from aggregating with one another and precipitating in a dispersion medium. That is, the nitrogen-containing carbon material according to the present embodiment can be uniformly dispersed in a dispersion medium, and as a result, it is possible to obtain a dispersion of a nitrogen-containing carbon material having a high level of dispersion stability. In this connection, in the case where the dispersibility of a nitrogen-containing carbon material in a dispersion medium is not maintained, the step of removing the fluorine atoms may be performed by a conventionally known method.

Although the dispersion medium is not particularly limited, preferred is a polar solvent in the present embodiment. The polar solvent is not particularly limited, and examples thereof include water, an organic solvent, and a mixed solution thereof. The organic solvent is not particularly limited, and examples thereof include alcohols such as 2-propanol and ethanol, DMF (N,N-dimethylformamide), THF (tetrahydrofuran), cyclohexane, and an ionic liquid. Among these organic solvents, in the present embodiment, the alcohol can enhance the dispersibility of a carbon material. Moreover, in the present embodiment, the nitrogen-containing carbon material can be added also to dispersion media for various inorganic materials, various metallic materials, various carbon materials and the like, and even in such a case, the nitrogen-containing carbon material is excellent in handling properties at the time of use and is also satisfactory in dispersibility. In the present embodiment, the dispersion medium may be used alone or these dispersion media may be mixed to be used.

Moreover, it is preferred that a surfactant as a dispersing agent not be added to a dispersion of the carbon material in accordance with the present embodiment. With this setup, it is possible to provide a dispersion composed only of the carbon material and a dispersion medium. Furthermore, it is possible to prevent an alkali metal, an organic substance and the like with which the surfactant is contaminated from being contained in the dispersion.

As stated above, when the manufacturing method according to the present embodiment is employed, it is possible to obtain a nitrogen-containing carbon material in which part of carbon atoms in the carbon skeleton are substituted with nitrogen atoms or part of carbon atoms in the carbon skeleton are substituted with nitrogen atoms, and amino groups are introduced onto a surface of the carbon material. And then, a nitrogen-containing carbon material obtained by the production method is one in which nitrogen atoms are introduced into the carbon skeleton without allowing structural defects of the carbon skeleton to occur. Moreover, for example, in the case where the nitrogen-containing carbon material of the present embodiment is single-walled carbon nanotubes into which nitrogen atoms are introduced, or the like, the charged state of a surface thereof and the carrier transport characteristics can be appropriately controlled, and the application thereof to a polarizable electrode of an electric double layer capacitor, an active layer of an organic thin film type photovoltaic power generation cell, an air electrode of a fuel cell, or the like becomes possible. In this connection, with regard to the application thereof to an air electrode of a fuel cell, specifically, there is a possibility that the nitrogen-containing carbon material is used as a catalyst for the air electrode.

Example 1

A single-walled carbon nanotube (10 mg) was introduced into a PTFE (polytetrafluoroethylene) vessel (5 mL in capacity), and the vessel was installed in an electrolytically polished SUS316L chamber (30 mL in capacity). Furthermore, the inside of the chamber was evacuated to a vacuum and replaced with nitrogen, and the temperature thereof was elevated to 250° C. at 4° C./min under a stream of nitrogen (20 mL/min) to perform an isothermal treatment for two hours.

Next, the inside of the chamber was evacuated to a vacuum and replaced with a first treatment gas prepared by diluting fluorine gas with nitrogen so that the content thereof became 20 vol %, and the first treatment gas was allowed to flow through the inside of the chamber at a rate of 25 mL/min. Furthermore, the temperature of the chamber was elevated to 250° C. at 4° C./min to perform a fluorination treatment for 4 hours. Then, the inside of the chamber was evacuated to a vacuum and replaced with nitrogen gas, the chamber was allowed to cool to room temperature under a stream of nitrogen (20 mL/min), and a single-walled carbon nanotube after being subjected to the fluorination treatment was removed.

Next, the single-walled carbon nanotube after being subjected to the fluorination treatment was placed in an electric tubular furnace, and the treatment temperature was set to 25° C. Then, a second treatment gas prepared by diluting $NH_3$ gas with nitrogen gas so that the content thereof became 1.0 vol % was allowed to flow to perform a nitriding treatment. The treatment period was set to 30 minutes. Then, the inside of the furnace was evacuated to a vacuum and replaced with nitrogen gas, the furnace was allowed to cool to room temperature under a stream of nitrogen (250 mL/min), and the inside of the furnace was evacuated to a vacuum and replaced with nitrogen gas to produce a nitrogen-containing single-walled carbon nanotube.

Examples 2 to 7

In Examples 2 to 7, the treatment temperature at the time of a nitriding treatment was changed within the range of 100° C. to 600° C. in 100° C. increments. Other than that, each nitrogen-containing single-walled carbon nanotube was prepared in the same manner as that in Example 1.

Example 8

In Example 8, multi-walled carbon nanotubes were used in place of the single-walled carbon nanotubes. Moreover, the temperature at the time of a nitriding treatment was changed to 600° C. Other than that, nitrogen-containing multi-walled carbon nanotubes were prepared in the same manner as that in Example 1.

Example 9

In Example 9, carbon black (available from Lion Corporation, KETJENBLACK ECP600JD) was used in place of the single-walled carbon nanotubes. Moreover, the temperature at the time of a fluorination treatment and the temperature at the time of a nitriding treatment were changed to 50° C. and 400° C., respectively. Other than that, a kind of nitrogen-containing carbon black was prepared in the same manner as that in Example 1.

Examples 10 and 11

In Examples 10 and 11, the temperatures at the time of a fluorination treatment were changed to 100° C. and 150° C., respectively. Other than that, a kind of nitrogen-containing carbon black was prepared in the same manner as that in Example 9.

Example 12

In Example 12, the temperature at the time of a nitriding treatment was changed to 600° C. Other than that, a kind of nitrogen-containing carbon black was prepared in the same manner as that in Example 11.

Reference Example 1

The nitrogen-containing single-walled carbon nanotubes prepared in Example 2 were added to an aqueous hydrazine solution, and the fluorine remaining on the nitrogen-containing single-walled carbon nanotubes was removed to obtain nitrogen-containing single-walled carbon nanotubes according to the present reference example.

Reference Example 2

The nitrogen-containing single-walled carbon nanotubes prepared in Example 5 were added to an aqueous hydrazine solution, and the fluorine remaining on the nitrogen-containing single-walled carbon nanotubes was removed to obtain nitrogen-containing single-walled carbon nanotubes according to the present reference example.

Elemental Analysis

Figure 2:
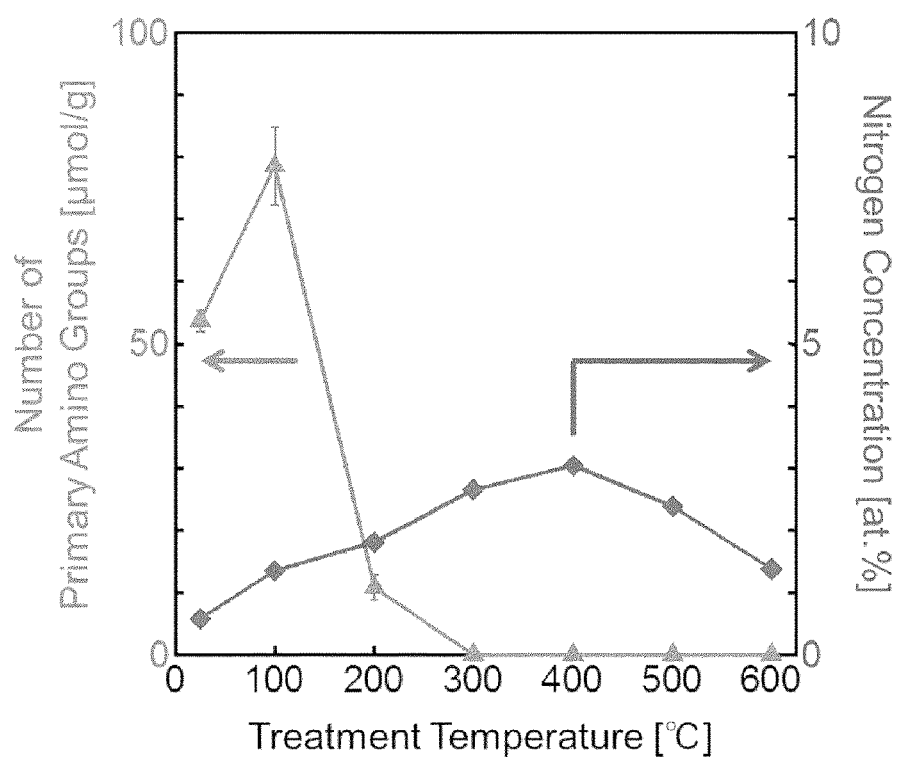
FIG. 2 is a graph showing the relationship between the amount of amino groups introduced or the atomic composition percentage of the nitrogen atoms in the nitrogen-containing single-walled carbon nanotubes of the present examples and the treatment temperature of the nitriding treatment.

Each of the nitrogen-containing single-walled carbon nanotubes obtained in Examples 1 to 7, the nitrogen-containing multi-walled carbon nanotubes obtained in Example 8 and the four kinds of nitrogen-containing carbon black obtained in Examples 9 to 12 was subjected to the elemental analysis with an X-ray photoelectron spectrometer (KRATOS AXIS-HSi available from SHIMADZU CORPORATION). Moreover, in order to confirm the presence or absence of an amino group, the Kaiser test was performed. Furthermore, the atomic composition percentage of the nitrogen atom in each of the nitrogen-containing single-walled carbon nanotubes, the nitrogen-containing multi-walled carbon nanotubes and the four kinds of nitrogen-containing carbon black of respective examples was also calculated. The results are shown in the following Table 1 and FIG. 2.

TABLE 1

| | Carbon material | Fluorination treatment | | | Nitriding treatment | | | Atomic composition percentage of N (at. %) |
| --- | --- | --- | --- | --- | --- | --- | --- | --- |
| | | | | | NH$_3$ | | | |
| | | F$_2$ concentration (vol %) | Treatment temperature (° C.) | Treatment period | concentration (vol %) | Treatment temperature (° C.) | Treatment period | |
| Example 1 | Single- | 20 | 250 | 4 hours | 1.0 | 25 | 30 minutes | 0.58 |
| Example 2 | walled | | | | | 100 | | 1.35 |
| Example 3 | carbon | | | | | 200 | | 1.81 |
| Example 4 | nanotube | | | | | 300 | | 2.64 |
| Example 5 | | | | | | 400 | | 3.04 |
| Example 6 | | | | | | 500 | | 2.38 |
| Example 7 | | | | | | 600 | | 1.38 |
| Example 8 | Multi-walled carbon nanotube | 20 | 250 | 4 hours | 1.0 | 600 | 30 minutes | 2.6 |
| Example 9 | Carbon black | 20 | 50 | 4 hours | 1.0 | 400 | 30 minutes | 3.7 |
| Example 10 | | | 100 | | | 400 | | 4.1 |
| Example 11 | | | 150 | | | 400 | | 4.2 |
| Example 12 | | | 150 | | | 600 | | 4.7 |

Moreover, with regard to the nitrogen-containing single-walled carbon nanotubes obtained in Examples 4 to 7, the chemical state of the nitrogen atom introduced into the carbon skeleton was confirmed by XPS analysis. The results are shown in the following Table 2 and FIG. 3.

TABLE 2

| | Chemical composition (at. %) | | | | Component of nitrogen species (at. %) | | | | |
| --- | --- | --- | --- | --- | --- | --- | --- | --- | --- |
| | C | O | F | N | N1 | N2 | N3 | N4 | N5 |
| Example 1 | 74.1 | 1.50 | 23.21 | 0.58 | 0.02 | 0.20 | 0.08 | 0.03 | 0.06 |
| Example 2 | 76.19 | 1.94 | 20.52 | 1.35 | 0.42 | 0.48 | 0.22 | 0.17 | 0.06 |
| Example 3 | 82.15 | 2.16 | 13.87 | 1.81 | 0.82 | 0.21 | 0.48 | 0.24 | 0.05 |
| Example 4 | 96.49 | 1.22 | 0.91 | 2.64 | 1.13 | 0.04 | 1.05 | 0.34 | 0.08 |
| Example 5 | 94.2 | 1.62 | 1.14 | 3.04 | 1.22 | 0.04 | 1.36 | 0.34 | 0.08 |
| Example 6 | 95.19 | 1.63 | 0.80 | 2.38 | 0.93 | 0.04 | 1.19 | 0.16 | 0.06 |
| Example 7 | 96.49 | 1.22 | 0.91 | 1.38 | 0.58 | 0.01 | 0.65 | 0.10 | 0.04 |

Structure Analysis for Nitrogen-Containing Carbon Material

Figure 4:
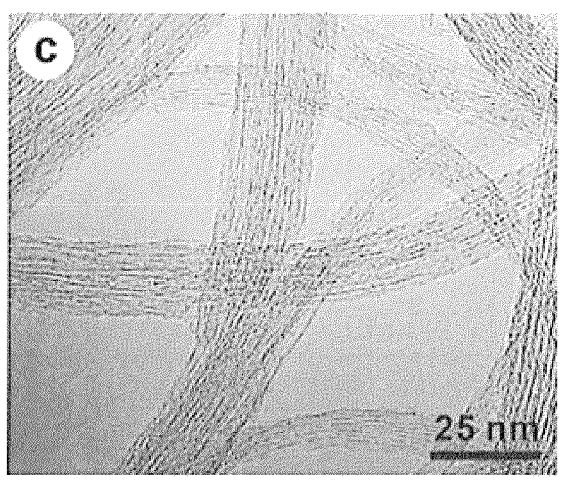
FIG. 4 is a TEM photograph of nitrogen-containing single-walled carbon nanotubes in accordance with the present Example 5.

First, with regard to the nitrogen-containing single-walled carbon nanotubes prepared in Example 5, the observation was performed using a transmission electron microscope (TEM). The TEM photograph is shown in FIG. 4. From the TEM photograph, it has been confirmed that the carbon skeleton of the carbon nanotubes is not damaged and there are no structural defects.

Dispersibility

Each of the nitrogen-containing single-walled carbon nanotubes prepared in Examples 2 and 5 and Reference Examples 1 and 2 was added to IPA (2-propanol) and subjected to an ultrasonic treatment for 2 hours to prepare a nitrogen-containing single-walled carbon nanotube dispersion having a concentration of 100 ppm. These dispersions were allowed to stand still, whereupon in the cases of the nitrogen-containing single-walled carbon nanotubes according to Examples 2 and 5, it has been confirmed that a satisfactory dispersion state is maintained for 150 hours or more.

On the other hand, in the case of the nitrogen-containing single-walled carbon nanotubes according to Reference Example 1, it has been confirmed that the nitrogen-containing single-walled carbon nanotubes aggregate and precipitate at the end of 50 hours. Moreover, in the case of the nitrogen-containing single-walled carbon nanotubes according to Reference Example 2, it has been confirmed that the nitrogen-containing single-walled carbon nanotubes aggregate and precipitate at the end of 24 hours.

Volume Resistivity

Each of single-walled carbon nanotubes before treatment (SWCNTs), single-walled carbon nanotubes after fluorination treatment (F-SWCNTs) and the nitrogen-containing single-walled carbon nanotubes according to Examples 4 to 7 was measured for the volume resistivity by a four-terminal four-probe method using a resistivity meter (Loresta GP MCPT600, available from Mitsubishi Chemical Analytech Co., Ltd.) (temperature 25° C., humidity 35%). In this connection, a sample to be measured was formed into a size with a diameter of 16 mm and a thickness of 100 μm. The measurement results are shown in the following Table 3.

TABLE 3

| Carbon material | Treatment temperature of nitriding treatment (° C.) | Volume resistivity (Ω · cm) |
| --- | --- | --- |
| Single-walled carbon nanotube | — | $9.0 \pm 1.0 \times 10^{-2}$ |
| Single-walled carbon | — | $7.1 \pm 3.9 \times 10^{4}$ |

TABLE 3-continued

| Carbon material | Treatment temperature of nitriding treatment (° C.) | Volume resistivity (Ω·cm) |
|---|---|---|
| nanotube after fluorination treatment | | |
| Example 4  Nitrogen-containing single- | 300 | 3.7 ± 0.1 |
| Example 5  walled carbon nanotube | 400 | 2.3 ± 1.1 |
| Example 6 | 500 | 1.9 ± 0.6 |
| Example 7 | 600 | 3.6 ± 0.7 |

Measurement for Seebeck Coefficient

With regard to single-walled carbon nanotubes before treatment (SWCNTs) and the nitrogen-containing single-walled carbon nanotubes according to Example 5, the measurement for Seebeck coefficient was performed. That is, a sample with a size of 5.0×12 mm², as one for measurement, was prepared, both ends in the long-side direction of the sample were provided with a temperature difference (ΔT), the temperature difference between two electrodes located at both ends in the long-side direction and the induced potential difference (ΔV) were measured, and a value of (potential difference)/(temperature difference) was calculated to determine a Seebeck coefficient. The results are shown in FIGS. 5A to 5D.

Charged State of Surface

Figure 6:
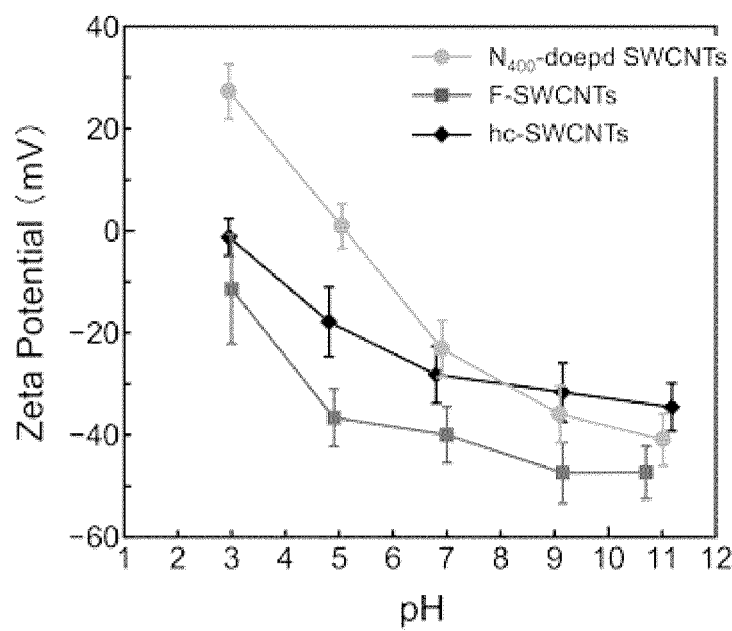
FIG. 6 is a graph showing the relationship between the pH and the zeta potential in single-walled carbon nanotubes before treatment, single-walled carbon nanotubes after fluorination treatment and nitrogen-containing single-walled carbon nanotubes in accordance with Example 5.

Each of single-walled carbon nanotubes before treatment (SWCNTs), single-walled carbon nanotubes after fluorination treatment (F-SWCNTs) and the nitrogen-containing single-walled carbon nanotubes according to Example 5 (N400-doped SWCNTs) was dispersed in an aqueous hydrochloric acid solution or an aqueous sodium hydroxide solution so that five aqueous solutions of each of the carbon nanotubes have five different pH values (3, 5, 7, 9 and 11). Then, the measurement was performed at room temperature (25° C.) using a zeta potential measuring apparatus (ZEECOM ZC2000, available from MICROTEC CO., LTD., Japan). The results are shown in FIG. 6.

Catalytic Activity in Oxygen Reduction Reaction

Figure 7:
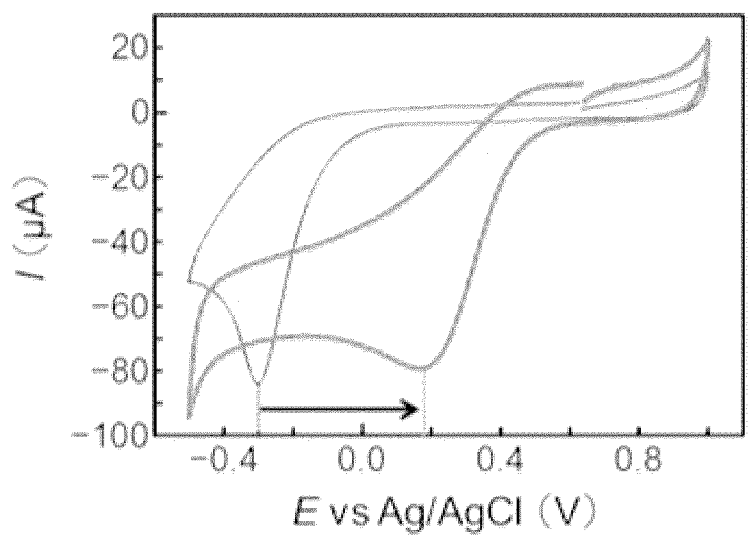
FIG. 7 is a graph showing the oxygen reduction activity in nitrogen-containing single-walled carbon nanotubes in accordance with the present Example 5.

Each of single-walled carbon nanotubes before treatment (SWCNTs) and the nitrogen-containing single-walled carbon nanotubes according to Example 5 was evaluated for the catalytic activity in an oxygen reduction reaction (ORR). Specifically, a sample prepared in Example 5, a 5% Nafion solution and ethanol were mixed at a mass ratio of 1:10:100 and subjected to ultrasonic dispersion for 30 minutes or more to prepare a suspension. A product prepared by adding 12 μL of this suspension dropwise onto a glassy carbon electrode (diameter: 6 mm) and leaving this to stand overnight at room temperature under ethanol saturated vapor pressure so as to be thoroughly dried was used as the working electrode, and the cyclic voltammetry (CV) measurement was performed. The results are shown in FIG. 7.

The measurement conditions for the CV measurement were as follows.

Electrolytic solution: aqueous 0.5 M sulfuric acid solution
Sweet rate: 10 mV/sec
Potential sweep range (potential window): −0.5 to 1.0 V (vs. Ag/AgCl)
Reference electrode: Ag/AgCl
Counter electrode: platinum wire-plate The present invention relates to a nitrogen-containing carbon material and a manufacturing method thereof, and more specifically, the present invention relates to a nitrogen-containing carbon material prepared by allowing a nitrogen atom to be contained in a carbon material having a carbon skeleton formed of carbon atoms such as a carbon nanotube, and a manufacturing method thereof.

Results

As shown in Table 1, it has been confirmed that in the case of the nitrogen-containing carbon material of the present example, nitrogen atoms can be introduced at a high concentration into the carbon skeleton. For example, in the case where the carbon material is single-walled carbon nanotubes, when the treatment temperature of a nitriding treatment is higher than or equal to 100° C., nitrogen atoms can be introduced within the range of 1.4 to 3.0 at. %.

Moreover, as shown in Table 1, with regard to the atomic composition percentage of the nitrogen atoms in each of the nitrogen atom-containing single-walled carbon nanotubes, when the nitriding treatment temperature is 400° C., the atomic composition percentage has become the largest value of 3.0 at. %.

Figure 3:
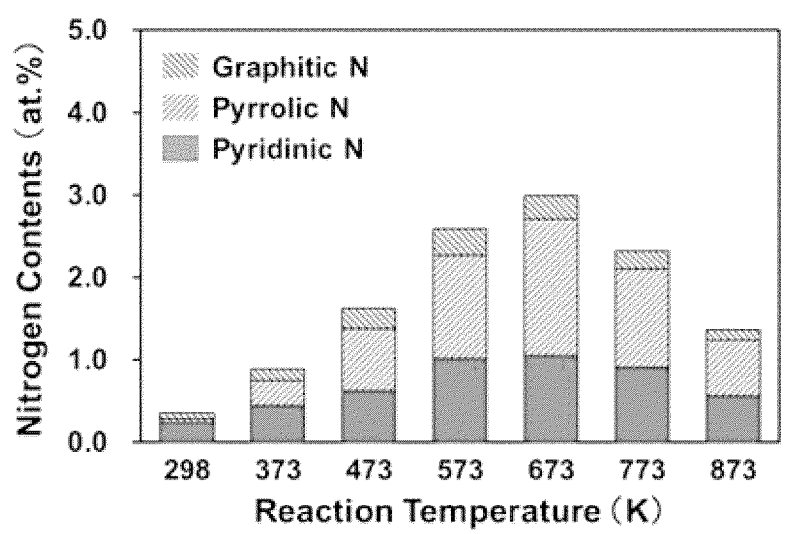
FIG. 3 is a graph showing the treatment temperature and the concentration of nitrogen species at the time of the nitriding treatment for the nitrogen-containing single-walled carbon nanotubes according to the present examples.

Moreover, as shown in Table 2 and FIG. 3, in the nitrogen-containing single-walled carbon nanotubes of Example 1, it has been confirmed that nitrogen atoms introduced into the carbon skeleton are mainly pyridine-type nitrogen atoms. Moreover, in the nitrogen-containing single-walled carbon nanotubes of Examples 2 to 7, it has been confirmed that nitrogen species introduced into the carbon skeleton are mainly pyrrole-type nitrogen atoms and pyridine-type nitrogen atoms.

With regard to the volume resistivity, as shown in Table 3, while the single-walled carbon nanotubes after fluorination treatment have a value of $7.1 \pm 3.9 \times 10^4$ Ω·cm, in any of the nitrogen-containing single-walled carbon nanotubes after fluorination treatment and nitriding treatment, the value is small and it has been confirmed that the carbon nanotubes are excellent in carrier transport characteristics.

Figure 5A:
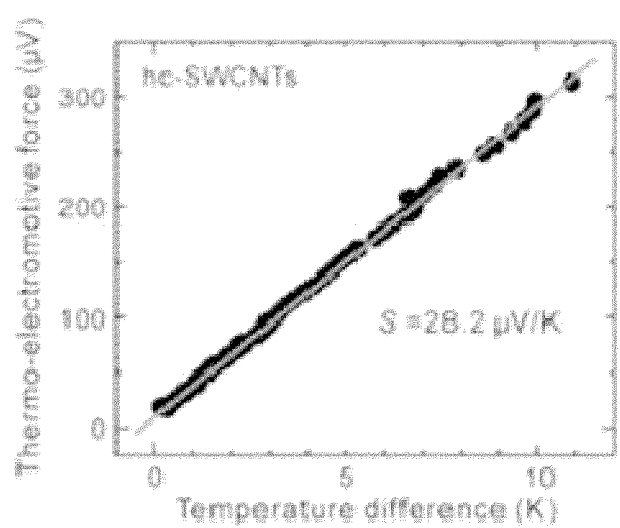
FIG. 5A is a graph showing the relationship between the thermo-electromotive force and the temperature difference in single-walled carbon nanotubes before treatment.
Figure 5B:
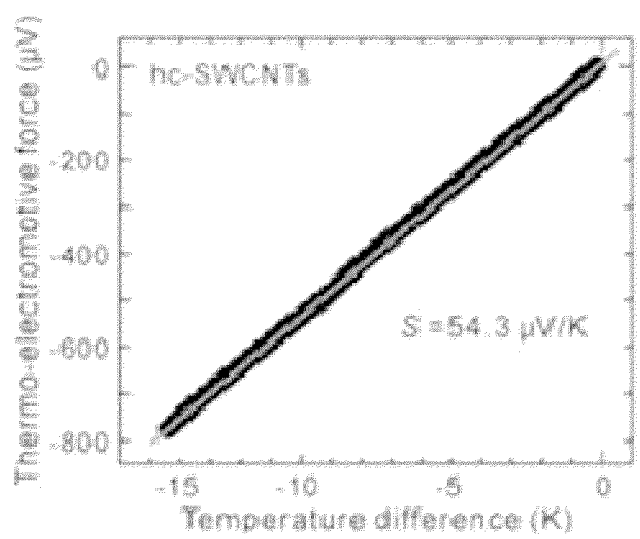
FIG. 5B is a graph showing the relationship between the thermo-electromotive force and the temperature difference in single-walled carbon nanotubes before treatment.
Figure 5C:
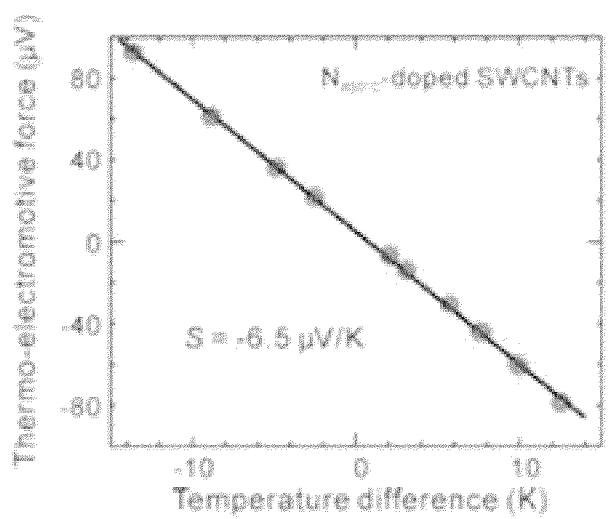
FIG. 5C is a graph showing the relationship between the thermo-electromotive force and the temperature difference in nitrogen-containing single-walled carbon nanotubes in accordance with Example 5.
Figure 5D:
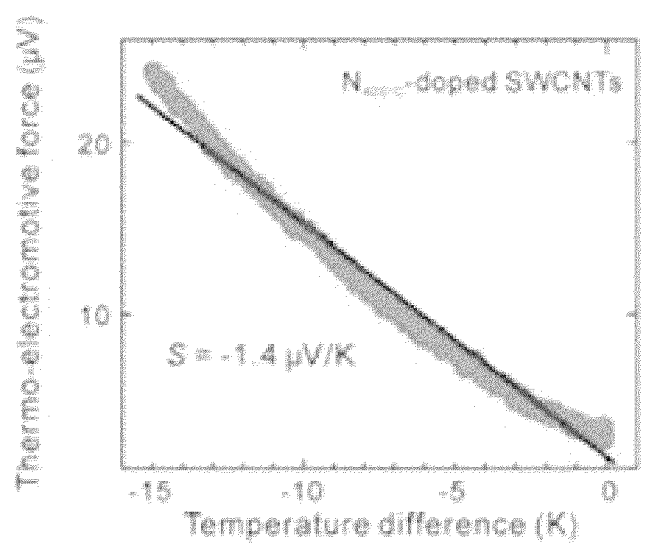
FIG. 5D is a graph showing the relationship between the thermo-electromotive force and the temperature difference in nitrogen-containing single-walled carbon nanotubes in accordance with Example 5.

Moreover, from the measurement results of Seebeck coefficient, in the nitrogen-containing single-walled carbon nanotubes of Example 5 for which the nitriding treatment was performed at a treatment temperature of 400° C., it has been found that n-type carrier transport characteristics are exerted in the atmosphere (see FIGS. 5C and 5D). On the other hand, in single-walled carbon nanotubes before treatments, p-type characteristics were exerted (see FIGS. 5A and 5B). In the nitrogen-containing single-walled carbon nanotubes of Example 5, since there are many graphite-type nitrogen atoms in the nitrogen atoms introduced into the carbon skeleton as compared with other nitrogen-containing single-walled carbon nanotubes, it is suggested that the graphite-type nitrogen atoms can effectively function as n-type dopants.

With regard to the charged state of the surface, as shown in FIG. 6, in the nitrogen-containing single-walled carbon nanotubes in the case where the nitriding treatment was performed at a treatment temperature of 400° C., it has been confirmed that the zeta potential is positive even when the pH is less than or equal to 5. From this, for example, in the case where the nitrogen-containing single-walled carbon nanotubes of the present example are used as a material for the electrode and an acidic electrolytic solution is used in an electric double layer capacitor, or the like, the increase in electric capacitance can be attained.

With regard to the ORR catalytic activity, as shown in FIG. 7, as compared with a single-walled carbon nanotubes before treatment, the oxygen reduction potential was shifted to the noble potential side (the direction shown by the arrow in the graph) by 0.5 V or more. In the nitrogen-containing single-walled carbon nanotubes of Example 5, it is presumed that, since nitrogen atoms introduced into the carbon skeleton are mainly pyridine-type nitrogen atoms and pyrrole-type nitrogen atoms, the electronic state of the single-walled carbon nanotubes is changed by these nitrogen atoms and the ORR catalytic activity is enhanced. For example, in the case where the nitrogen-containing single-walled carbon nanotubes according to the present example are used as a catalyst material for the air electrode of a fuel cell, it is possible to remarkably promote the oxygen reduction reaction in the air electrode and to attain the enhancement in battery performance.

What is claimed is:

1. A nitrogen-containing carbon material comprising:
   a carbon material having a carbon skeleton formed of carbon atoms; and
   a nitrogen atom introduced into the carbon material,
   wherein part of the carbon atoms in the carbon skeleton are replaced with nitrogen atoms, at least one amino group is attached to a surface of the nitrogen-containing carbon material, carbon-fluorine bonds are present on a surface of the nitrogen-containing carbon material and nitrogen-fluorine bonds are not present on the nitrogen-containing carbon material.

2. The nitrogen-containing carbon material according to claim 1, wherein the nitrogen atoms introduced into the carbon skeleton by replacing part of carbon atoms therewith comprise pyridine-type nitrogen atoms, or pyridine-type nitrogen atoms and pyrrole-type nitrogen atoms.

3. The nitrogen-containing carbon material according to claim 1, wherein the carbon material before nitrogen atoms are introduced thereinto is at least one kind selected from the group consisting of a carbon nanocoil, graphite, carbon black, diamond-like carbon, a carbon fiber, graphene, amorphous carbon, fullerene, a carbon nanotube and diamond.

4. A method of producing the nitrogen-containing carbon material according to claim 1, comprising the steps of:
   bringing a carbon material having a carbon skeleton formed of carbon atoms into contact with a first treatment gas containing a fluorine-containing gas to subject a surface of the carbon material to a fluorination treatment; and
   bringing the carbon material after being subjected to the fluorination treatment into contact with a second treatment gas containing a nitrogen-containing gas to perform a nitriding treatment.

5. The method of producing the nitrogen-containing carbon material according to claim 4,
   wherein the fluorination treatment is performed under the condition of a treatment period of 1 second to 24 hours and a treatment temperature of 0° C. to 600° C. using a first treatment gas containing a fluorine-containing gas in a content of 0.01 to 100 vol % relative to the whole volume of the first treatment gas, and
   the nitriding treatment is performed under the condition of a treatment period of 1 second to 24 hours using a second treatment gas containing a nitrogen-containing gas in a content of 0.01 to 100 vol % relative to the whole volume of the second treatment gas.

6. The method of manufacturing the nitrogen-containing carbon material according to claim 5, wherein the nitriding treatment is carried out at a treatment temperature higher than or equal to 25° C. and lower than 300° C., to introduce at least one amino group onto a surface of the carbon material and to replace part of the carbon atoms in the carbon skeleton with nitrogen atoms.

7. The method of producing the nitrogen-containing carbon material according to claim 6, wherein the nitrogen atoms introduced into the carbon skeleton by replacing part of the carbon atoms therewith comprise pyridine-type nitrogen atoms, or pyridine type nitrogen atoms and pyrrole-type nitrogen atoms.

8. The method of producing the nitrogen-containing carbon material according to claim 4, comprising no step for removing fluorine atoms existing at carbon-fluorine bond moieties on a surface of the nitrogen-containing carbon material after being subjected to the nitriding treatment.

9. The method of producing the nitrogen-containing carbon material according to claim 4, wherein the carbon material before being subjected to the fluorination treatment is at least one kind selected from the group consisting of a carbon nanocoil, graphite, carbon black, diamond-like carbon, a carbon fiber, graphene, amorphous carbon, fullerene, a carbon nanotube and diamond.

10. An air electrode catalyst for a fuel cell comprising the nitrogen-containing carbon material according to claim 1.

11. The air electrode catalyst for a fuel cell according to claim 10, wherein the nitrogen atoms introduced into the carbon skeleton by replacing part of carbon atoms therewith comprise pyridine-type nitrogen atoms, or pyridine-type nitrogen atoms and pyrrole-type nitrogen atoms.

12. The air electrode catalyst for a fuel cell according to claim 11, wherein the carbon material before nitrogen atoms are introduced thereinto is at least one kind selected from the group consisting of a carbon nanocoil, graphite, carbon black, diamond-like carbon, a carbon fiber, graphene, amorphous carbon, fullerene, a carbon nanotube and diamond.

* * * * *